(12) United States Patent
Li

(10) Patent No.: US 8,587,734 B2
(45) Date of Patent: Nov. 19, 2013

(54) ADAPTIVE LENS FOR VISION CORRECTION

(75) Inventor: Guoqiang Li, St. Louis, MO (US)

(73) Assignee: The Curators of the University of Missouri, Columbia, MO (US)

( * ) Notice: Subject to any disclaimer, the term of this patent is extended or adjusted under 35 U.S.C. 154(b) by 645 days.

(21) Appl. No.: 12/719,646

(22) Filed: Mar. 8, 2010

(65) Prior Publication Data

US 2010/0225834 A1 Sep. 9, 2010

Related U.S. Application Data

(60) Provisional application No. 61/209,387, filed on Mar. 6, 2009.

(51) Int. Cl.
*G02F 1/1333* (2006.01)
(52) U.S. Cl.
USPC ........... 349/13; 349/200; 349/201; 351/159.6
(58) Field of Classification Search
None
See application file for complete search history.

(56) References Cited

U.S. PATENT DOCUMENTS

| | | | |
|---|---|---|---|
| 4,981,342 A | 1/1991 | Fiala | |
| 5,066,301 A | 11/1991 | Wiley | |
| 5,108,169 A | 4/1992 | Mandell | |
| 5,359,444 A | 10/1994 | Piosenka et al. | |
| 5,451,766 A | 9/1995 | Van Berkel | |
| 5,712,721 A | 1/1998 | Large | |
| 6,491,391 B1 | 12/2002 | Blum et al. | |
| 6,619,799 B1 | 9/2003 | Blum et al. | |
| 6,871,951 B2 | 3/2005 | Blum et al. | |
| 6,992,731 B1 | 1/2006 | Morris | |
| 7,023,594 B2 | 4/2006 | Blum et al. | |
| 7,289,260 B2 | 10/2007 | Kaufman et al. | |
| 7,312,917 B2 | 12/2007 | Jacob | |
| 7,475,984 B2 | 1/2009 | Blum et al. | |
| 7,517,083 B2 | 4/2009 | Blum et al. | |
| 7,600,872 B2 | 10/2009 | Esser et al. | |
| 2002/0140899 A1 | 10/2002 | Blum et al. | |
| 2003/0231293 A1 | 12/2003 | Blum et al. | |

(Continued)

FOREIGN PATENT DOCUMENTS

JP 05297339 A * 11/1993

OTHER PUBLICATIONS

Bennett, Edward S., "Contact lens correction of presbyopia", Clin. Exp. Optom. 91, pp. 265-278 (May 2008).

(Continued)

*Primary Examiner* — Thanh-Nhan P Nguyen
(74) *Attorney, Agent, or Firm* — Senniger Powers LLP

(57) ABSTRACT

An adaptive liquid crystal lens system comprising a first substrate assembly, a second substrate assembly having a continuous phase profile, and a liquid crystal layer disposed between the first and second substrate assemblies. The first substrate assembly includes a first transparent substrate, an alignment layer, and a first conductive layer. The first conductive layer is disposed on the bottom surface of the first transparent substrate and adjacent to the top surface of the alignment layer. The second substrate assembly includes a second transparent substrate, a lens having a grooved surface, and a second conductive layer. The second conductive layer is a continuous layer adjacent to the lens. The liquid crystal layer is received in the grooves of the lens, and is adjacent to the bottom surface of the alignment layer. The alignment layer causes the liquid crystal material in the liquid crystal layer to be in a homeotropic state.

9 Claims, 9 Drawing Sheets

(56) References Cited

U.S. PATENT DOCUMENTS

| | | |
|---|---|---|
| 2004/0021929 A1 | 2/2004 | Nishioka et al. |
| 2004/0144953 A1 | 7/2004 | Sikharulidze |
| 2005/0270481 A1 | 12/2005 | Blum et al. |
| 2006/0098164 A1 | 5/2006 | Blum et al. |
| 2006/0164593 A1 | 7/2006 | Peyghambarian et al. |
| 2007/0052920 A1 | 3/2007 | Stewart et al. |
| 2007/0070491 A1 | 3/2007 | Jacob |
| 2007/0183293 A1 | 8/2007 | Murata et al. |
| 2008/0106633 A1 | 5/2008 | Blum et al. |
| 2008/0273167 A1 | 11/2008 | Clarke |
| 2008/0278681 A1 | 11/2008 | Blum et al. |
| 2009/0195749 A1 | 8/2009 | Blum et al. |
| 2009/0201464 A1 | 8/2009 | Dursteler Lopez et al. |
| 2009/0256977 A1 | 10/2009 | Haddock et al. |
| 2009/0279050 A1 | 11/2009 | McGinn et al. |

OTHER PUBLICATIONS

Biello, David, "Scientists Build Liquid Crystal Bifocals", Scientific American, Apr. 4, 2006, 1 page.

Callina, Tina et al., "Traditional Methods for the Treatment of Presbyopia: Spectacles, Contact Lenses, Bifocal Contact Lenses", Ophthalmol. Clin. N. Am. 19, pp. 25-33 (2006).

Caulfield, H. John, "The Alvarez-Lohmann lens as a do-nothing machine", Optics & Laser Technology 34, pp. 1-5 (2002).

Charman, W. N., "Can diffractive liquid crystal lenses aid presbyopes?" Ophthal. Physiol. Opt. 13, pp. 427-429 (1993).

Cho, Adrian, "Bye Bye Bifocals", Science, http://sciencenow.sciencemag.org/, Apr. 3, 2006, 2 pages.

Commander, L.G., "Variable focal length microlenses", Optics Communications 177, pp. 157-170 (2000).

Fowler, C.W., "Liquid crystal lens review", Ophthal. Physiol. Opt. 10, pp. 186-194 (1990).

Fowler, C.W., "A gradient-index ophthalmic lens based on Wood's convex pseudo-lens", Ophthalmic Physiol. Opt. 10 (3), pp. 262-270 (1990).

Fresnel Lenses Brochure, www.fresneltech.com/pdf/FresnelLenses.pdf, Fresnel Technologies, Inc., pp. 1-12 (2003).

Futhey, John A., "Diffractive bifocal intraocular lens", Proc. SPIE, vol. 1052, pp. 142-149 (1989).

Ji, Hee-Su et al., "Electrically controllable microlens array fabricated by anisotropic phase separation from liquid-crystal and polymer composite materials", Optics Letters, vol. 28, No. 13, pp. 1147-1149 (Jul. 1, 2003).

Klaus, Werner et al., "Adaptive LC lens array and its application", Proc. SPIE 3635, pp. 66-73 (1999).

Kowel, Stephen T. et al., "Focusing by electrical modulation of refraction in a liquid crystal cell", Applied Optics, vol. 23, No. 2, pp. 278-289 (1984).

Kowel, Stephen T. et al., "Adaptive spherical lens", Applied Optics, vol. 23, No. 16, pp. 2774-2777 (1984).

Letocha, Charles E., "The Invention and Early Manufacture of Bifocals", Survey of Ophthalmology, vol. 35, No. 3, pp. 226-235 (1990).

Li, Guoqiang et al., "High-efficiency switchable flat diffractive ophthalmic lens with three-layer electrode pattern and two-layer via structures", Applied Physics Letters, 90, No. 10, pp. 111105-11107 (2007).

Li, Guoqiang et al., "High-efficiency switchable diffractive lens", Proc. of SPIE, vol. 6310, 10 pages.

Li, Guoqiang et al., "Large-aperture switchable thin diffractive lens with interleaved electrode patterns", Applied Physics Letters 89, pp. 141120-141123 (2006).

Li, Guoquiang, "Liquid Crystal Lenses for Correction of Presbyopia", Sixth International Workshop on Adaptive Optics in Industry and Medicine, Jun. 12-15, 2007, Ireland, 6 pages.

Li, Guoqiang et al., "Switchable Diffractive Lens for Vision Correction", Optics & Photonics News, "Optics in 2006", p. 28 (Dec. 2006).

Li, Guoquiang et al., "Switchable electro-optic diffractive lens with high efficiency for ophthalmic applications", Proc. Natl. Acad. Sci. USA, vol. 103, pp. 6100-6104 (2006).

Lohmann, A.W., "A New Class of Varifocal Lenses", Applied Optics, vol. 9, No. 7, pp. 1669-1671 (1970).

Loktev, M. Yu et al., "Wave front control systems based on modal liquid crystal lenses", Review of Scientific Instruments, vol. 71, No. 9, pp. 3290-3297 (2000).

McOwan, P.W. et al., "A switchable liquid crystal binary Gabor lens", Optics Communications, vol. 103, pp. 189-193 (1993).

Morris, Michael G. et al., "Phakic Intraocular Lenses", Optics & Photonics News, pp. 26-31 (Sep. 2004).

Naumov A.F. et al., "Liquid-crystal adaptive lenses with modal control", Optics Letters, vol. 23, No. 13, pp. 992-994 (1998).

Nose, Toshiaki et al., "Effects of low polymer content in a liquid-crystal microlens", Optics Letters, vol. 22, No. 6, pp. 351-353 (1997).

Patel, J.S. et al., "Electrically controlled polarization-independent liquid-crystal Fresnel lens arrays", Optics Letters, vol. 16, No. 7, pp. 532-534 (1991).

Presnyakov, Vladimir V. et al., "Electrically tunable polymer stabilized liquid-crystal lens", Journal of Applied Physics 97, pp. 103101-103106 (2005).

Ren, Hongwen et al., "Inhomogeneous nanoscale polymer-dispersed liquid crystals with gradient refractive index", Applied Physics Letters, vol. 81, No. 19, pp. 3537-3539 (2002).

Ren, Hongwen et al., "Tunable Fresnel lens using nanoscale polymer-dispersed liquid crystals", Applied Physics Letters, vol. 83, No. 8, pp. 1515-1517 (2003).

Riza, Nabeel A. et al, "Three-terminal adaptive nematic liquid-crystal lens device", Optics Letters, vol. 19, No. 14, pp. 1013-1015 (1994).

Ruttimann, Jacqueline, "Better bifocals on the horizon", Nature, http://www.nature.com/news/2006/060403/full/060403-1.html#B1, Apr. 3, 2006, 2 pages.

Sato, Susumu et al., "Variable-Focus Liquid-Crystal Fresnel Lens", Japanese Journal of Applied Physics, vol. 24, No. 8, pp. L626-L628 (1985).

Soni, P. Sarita et al., "Is Binocular Contrast Sensitivity at Distance Compromised with Multifocal Soft Contact Lenses Used to Correct Presbyopia?", Optometry and Vision Science, vol. 80, No. 7, pp. 505-514 (2003).

Sun, Yi et al., "Development of liquid crystal adaptive lens with circular electrodes for imaging application", Proc. SPIE 4987, pp. 209-220 (2003).

Vdovin, Gleb, "On the possibility of intraocular adaptive optics", Optics Express, vol. 11, No. 7, pp. 810-817 (2003).

Wang, Bin et al., "Lens of electrically controllable focal length made by a glass lens and liquid-crystal layers", Applied Optics, vol. 43, No. 17, pp. 3420-3425 (2004).

Williams, G. et al., "Electrically controllable liquid crystal Fresnel lens", Proc. SPIE 1168, pp. 352-357 (1989).

Zhang, De-Ying et al., "Fluidic adaptive lens with high focal length tunability", Applied Physics Letters, vol. 82, No. 19, pp. 3171-3172 (2003).

International Search Report for PCT/US2010/026549 dated May 3, 2010, 4 pages.

International Preliminary Report on Patentability issued in PCT/US2010/026549, dated Sep. 6, 2011, 9 pages.

* cited by examiner 210  220  230

240

260

ADAPTIVE LENS FOR VISION CORRECTION

CROSS-REFERENCE TO RELATED APPLICATION

This application claims the benefit of U.S. Provisional Application No. 61/209,387, filed Mar. 6, 2009, the entire disclosures of which are incorporated herein by reference.

FIELD OF THE INVENTION

The present invention generally relates to electro-optic lenses and the fabrication thereof, and more particularly to tunable liquid crystal lenses for vision correction.

BACKGROUND OF THE INVENTION

Presbyopia is an age-related loss of accommodation of the human eye in which the lens of the eye becomes less flexible. As a result, the ability to shift focus from distant to near objects is compromised. FIG. 1 is a schematic of the human eye illustrating the various distances between which an eye with normal visual acuity can focus. Ophthalmic lenses with fixed focusing properties have been widely used as spectacles and contact lenses to aid in correcting presbyopia and other vision conditions.

Ophthalmic lenses are most useful if they have adjustable focusing power (i.e., the focusing power is not static). Adjustable focusing power provides the eye with an external accommodation to bring objects of interest at different distances into focus. Adjustable focusing power can be achieved using a mechanical zoom lens. However, the mechanical approach makes the spectacle bulky and costly.

One technique commonly used by ophthalmic lenses is area division. Area division refers to bifocal, trifocal, progressive, or contact lenses that enable the eye to focus on both near and distant objects by looking through a different section of the lens. FIG. 2A illustrates the portions of the lens aperture used for near and distance vision for aspheric 210, concentric 220, and translating 230 bifocal lenses. FIG. 2B illustrates the portions of the lens aperture used for near, distance, and intermediate vision in a trifocal lens 240. As illustrated, the field of view for each type of vision (e.g., near, intermediate, distance) is generally limited to a narrow corridor.

Additionally, progressive lenses cause some distortion. Many bifocal or multifocal contact and intraocular lenses use the simultaneous vision concept, where light is equally diffracted into several orders and each order corresponds to a focal length. The light efficiency is low and the user selectively suppresses the most blurred images that are not desired for a given task.

Another type of ophthalmic lenses is mono-vision lenses. Mono-vision lenses typically have a convex-concave shape, by which different focusing power is provided to each eye, one for near and the other for distant objects. However, mono-vision lenses affect the user's binocular depth perception. These lenses would be more capable and attractive if one could change their focusing power.

Currently known techniques, including liquid crystal (LC) adaptive lens technologies, that would allow the focusing power to be changed are not suitable for use with an ophthalmic lens. For example, fluidic adaptive lenses have been demonstrated, but are not particularly effective since the shape of the liquid is sensitive to external vibrations. Known electrically controllable liquid-crystal refractive lenses incorporating convex and concave substrates require a thick layer of LC (>400 um). Optical scattering caused by the thick LC layer results in low transmission and lengthy response and recovery times.

In LC lens designs that employ a Fresnel lens substrate, the thickness of the LC lens is reduced but the lens is optically active in the electrically off-state. This design is not desirable for ophthalmic applications since a loss of electrical power resulting in near-vision correction could be detrimental if it occurs during a critical distance vision task, such as driving. Thus, known LC lenses are unsuitable for ophthalmic applications, which require high light efficiency, relatively large aperture, fast switching time, low driving voltage, and power-failure-safe configuration.

SUMMARY OF THE INVENTION

The present invention provides a varifocal lens that is continuously tunable. Embodiments of the present invention provide a liquid crystal (LC) adaptive lens employing a hybrid diffractive lens structure. In one embodiment, the LC lens includes several features that make it particularly suitable for ophthalmic applications. For example, the LC lens may provide one or more of the following features: a large aperture, a high light efficiency, fast switching time, low driving voltage, a power-failure-safe configuration, and continuous adjustment of the focusing power.

In addition, embodiments of the present invention provide a method for fabricating a varifocal continuously tunable lens. In one embodiment, the fabrication method includes forming the lens using diamond turning techniques. In another embodiment, the fabrication method additionally or alternatively includes forming the lens using molding techniques.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

Figure 1:
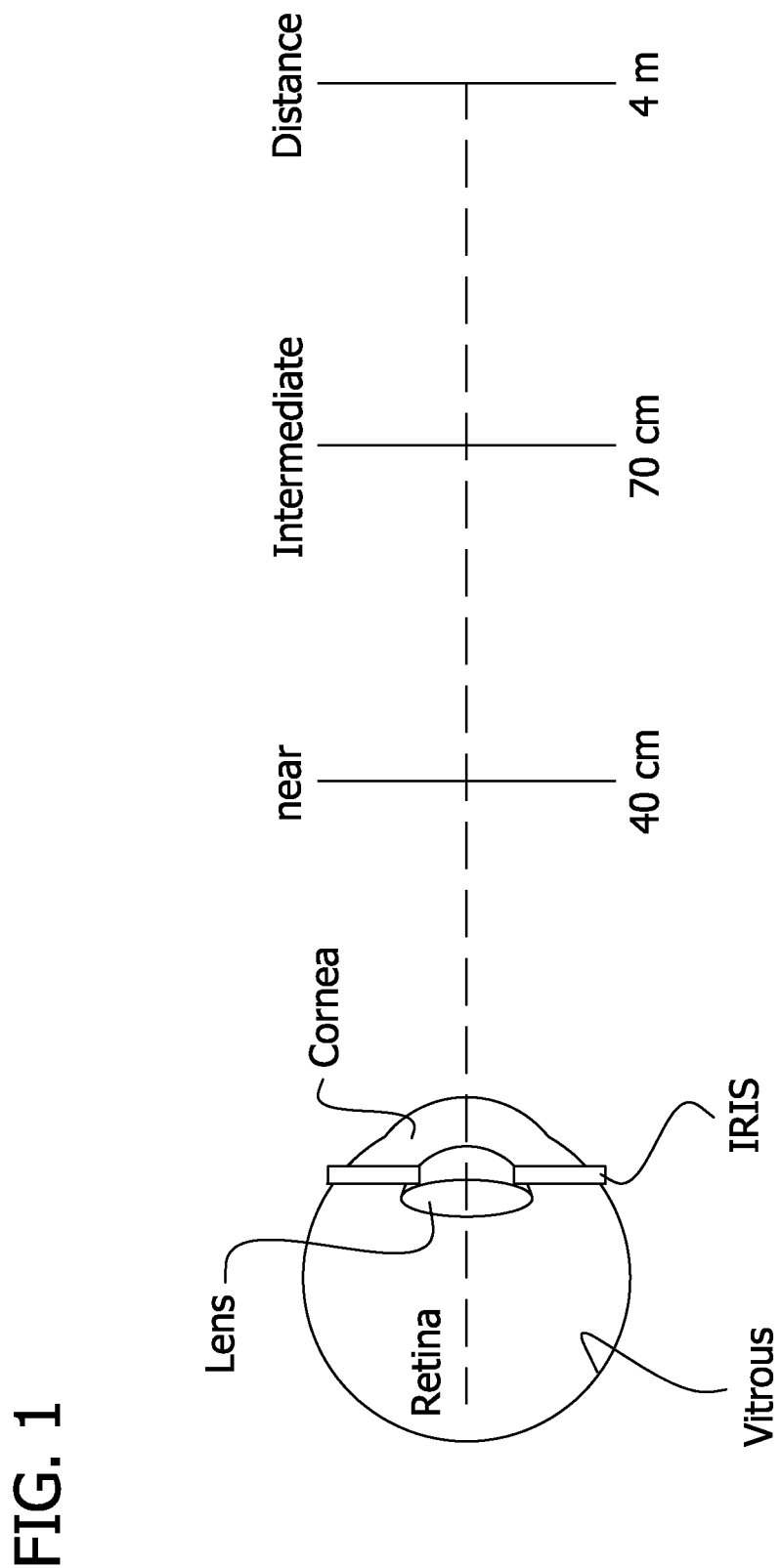
FIG. 1 is a schematic of the human eye illustrating the various distances between which an eye with normal visual acuity can focus.
Figure 2A:
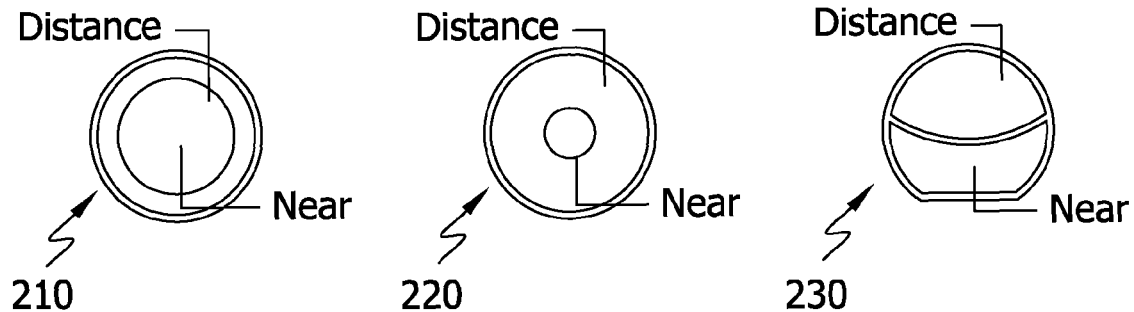
FIG. 2A is a diagram illustrating apertures bifocal lenses.
Figure 2B:
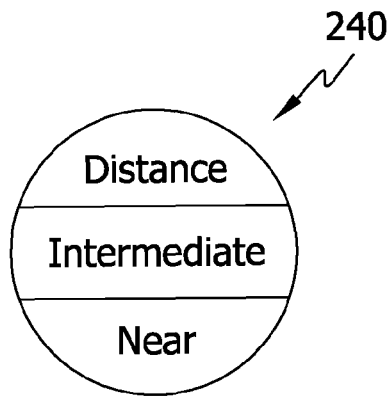
FIG. 2B is a diagram illustrating an aperture of a trifocal lens.
Figure 2C:
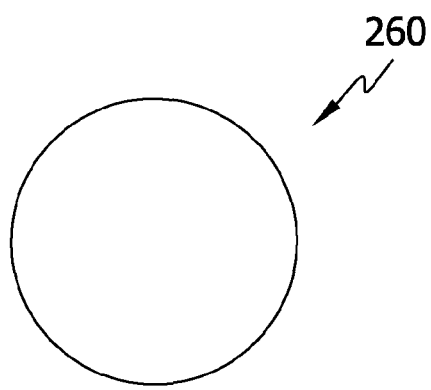
FIG. 2C is a diagram illustrating an aperture of a varifocal lens in accordance with an embodiment of the present invention.

The present invention provides a continuously tunable electro-optic lens. In one embodiment, the present invention provides a varifocal liquid crystal (LC) lens for use in ophthalmic applications and, in particular, for correcting near, intermediate, and/or distance vision. In contrast with the bifocal 210, 220, 230 and trifocal lenses 240 illustrated in FIGS. 2A and 2B, respectively, FIG. 2C illustrates an LC lens 260 in accordance with the present invention that allows the entire lens aperture (i.e., a substantial portion of the lens aperture) to be used for each vision task (e.g., near, intermediate, distance).

Figure 3:
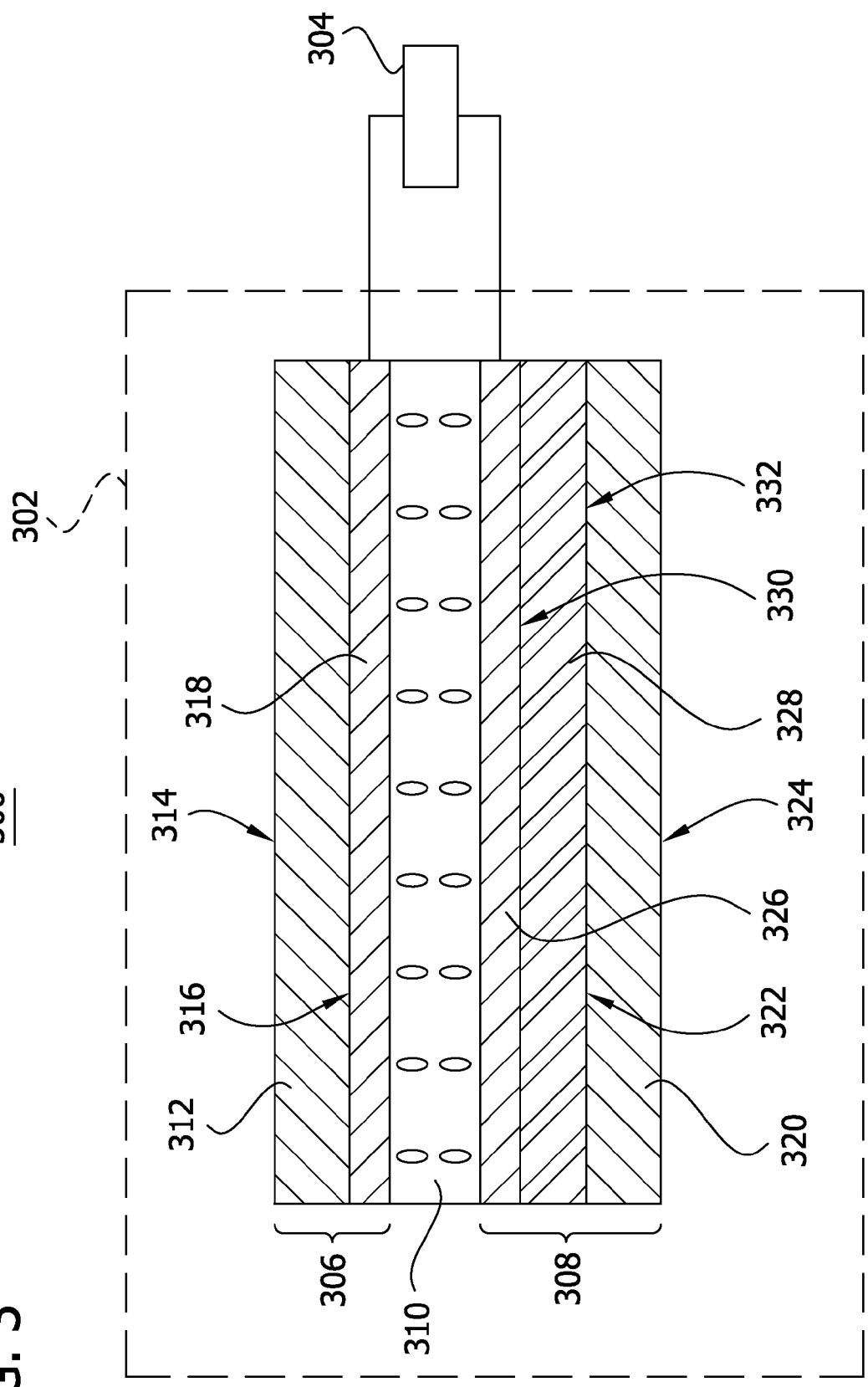
FIGS. 3-6 are diagrams each illustrating a cross section of an adaptive liquid crystal lens in accordance with an embodiment of the present invention.

FIG. 3 a block diagram of LC lens system 300 in accordance with an embodiment of the present invention. The LC lens system 300 includes an LC lens 302 and a control unit 304. The LC lens 302 includes a first substrate assembly 306, a second substrate assembly 308, and an LC layer 310 between the first substrate assembly 306 and the second substrate assembly 308. The LC layer 310 may include a cell filled with LC material, such as E7 liquid crystal available from Merck or other positive or negative liquid crystals. The control unit 304 is connected to the first and second substrate assemblies 306, 308 for generating a voltage across to the LC layer 310 in order to adjust the focusing power of the whole LC lens 302.

The first substrate assembly 306 includes a first substrate 312 comprising a substantially transparent material such as glass or plastic. The first substrate 312 has a top surface 314 and a bottom surface 316 as illustrated in FIG. 3. A first conductive layer 318 (e.g., first electrode layer) comprising a conductive material, such as indium oxide, tin oxide, or indium tin oxide (ITO), is substantially uniformly/continuously disposed on (e.g., adjacent to) the bottom surface 316 of the first substrate 312.

Like the first substrate assembly 306, the second substrate assembly 308 includes a second substrate 320 comprising a substantially transparent material such as glass or plastic. While the first and second substrates 312 and 320 are generally flat in the illustrated LC lens 302, the first substrate 312 and/or the second substrate 320 may be curved without departing from the scope of the invention. The second substrate 320 has a top surface 322 and a bottom surface 324 as illustrated in FIG. 3.

A lens 328 (e.g., glass, plastic) having a bottom surface 330 and a top surface 332 is formed (e.g., disposed, adhered) on the top surface 322 of the second substrate 320. In particular, the bottom surface 330 of the lens is adjacent to the top surface 322 of the second substrate 320. In one embodiment, the bottom surface 330 of the lens 328 is substantially coplanar (e.g., flat) and the top surface 332 is non-coplanar surface (e.g., convex, concave, grooved). A second conductive layer 326 (e.g., second electrode layer) comprising a substantially conductive material, such as indium oxide, tin oxide, or indium tin oxide (ITO), is substantially uniformly/continuously disposed on (e.g., adjacent to) the top surface 332 of the lens 328. Thus, the second conductive layer 326 is a continuous layer adjacent to the lens 328. In particular, the conductive material substantially covers the entire top surface 332 of the lens 328 such that the top surface 332 is generally free of any voids. Thus, the conductive material is continuous along the diameter/length of the top surface 332 of the lens 328. The first and second conductive layers 318, 326 are thin (e.g., around 50 nanometers). Because the second conductive layer 326 is disposed uniformly on the lens 328, the LC lens 302 may be continuously adjusted. More specifically, the focal length can be adjusted to essentially any value and is not limited to strict multiples of the original focal length.

Figure 4:
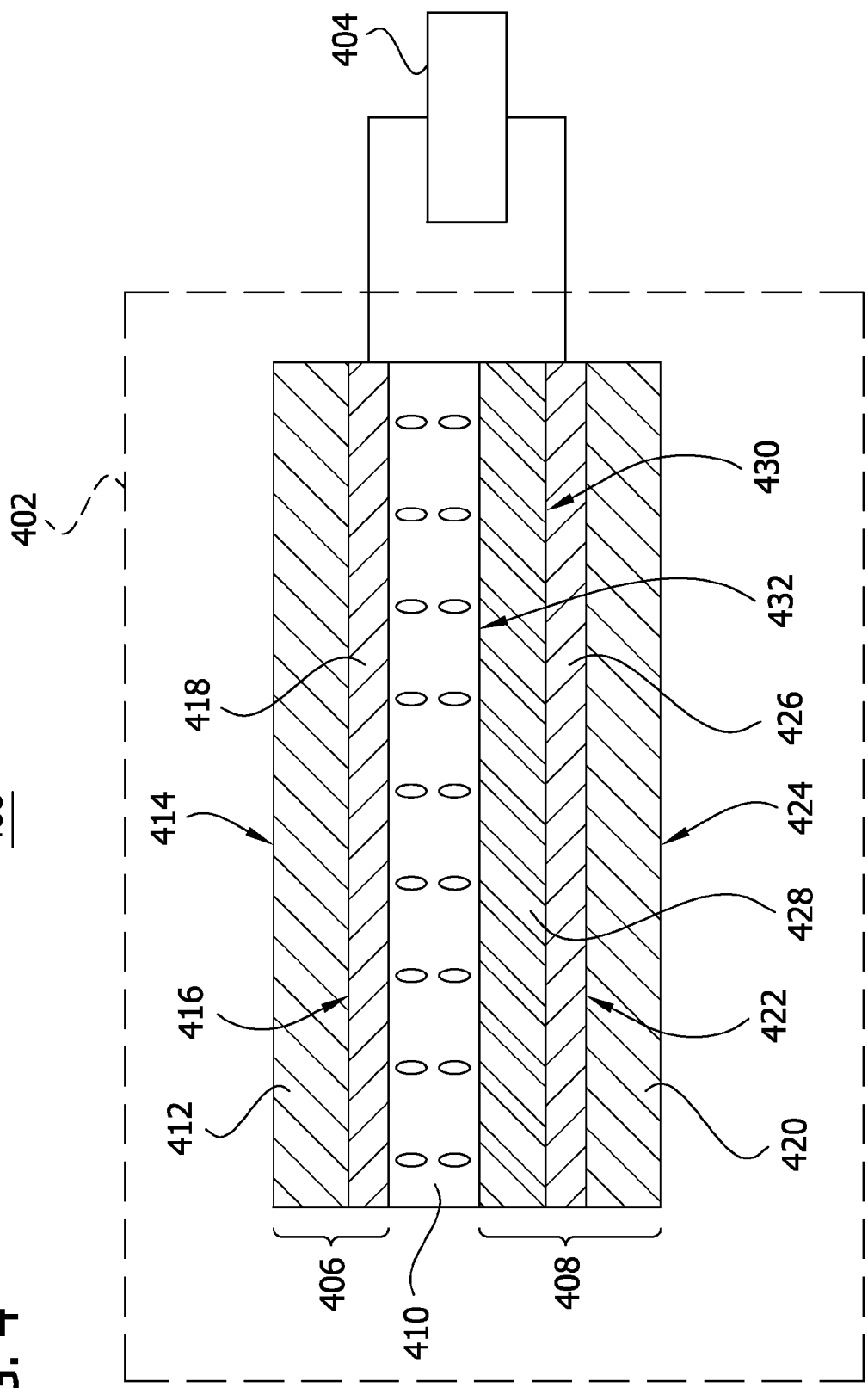

In accordance with an alternative embodiment illustrated in FIG. 4, the second conductive layer 426 may be disposed between the lens 428 and the second substrate 420. In particular, the second conductive layer is uniformly/continuously disposed on the top surface 422 of the second substrate 420 adjacent to the bottom surface 430 of the lens 428. Specifically, the conductive material contacts the entire bottom surface 430 of the lens 428 so that the bottom surface 430 is generally free of any voids in coverage. Thus, the conductive material is continuous along the diameter/length of the bottom surface 430 of the lens 428. Similar to the LC lens 302 illustrated in FIG. 3, the focal length of the LC lens 402 may be continuously adjusted since the second conductive layer 426 is disposed continuously/uniformly with respect to the lens 428.

The control unit 304 (e.g., driver and controller) is electrically connected to the first and second conductive layers 318, 326 such that the first conductive layer 318 operates as a ground electrode. In one embodiment, the control unit 304 is selectively operated between an off mode and an on mode. During the off mode, no voltage is applied across the LC layer 310. During the on mode, voltage is applied across the LC layer 310 and the level of voltage being applied is adjusted in order to control (e.g., tune, adjust) the focal length of the lens 328. In one embodiment, the control unit 304 includes an actuator (e.g., button, switch, knob, touch screen) which allows a user to manually adjust the voltage level and thereby adjust the focus of the LC lens 302. In another embodiment, the control unit 304 additionally or alternatively includes an eye tracker to sense/detect the distance of the object from the user (i.e., viewer). The controller adjusts the applied voltage level as a function of the sensed distance and thereby focuses of the LC lens 304.

Figure 5:
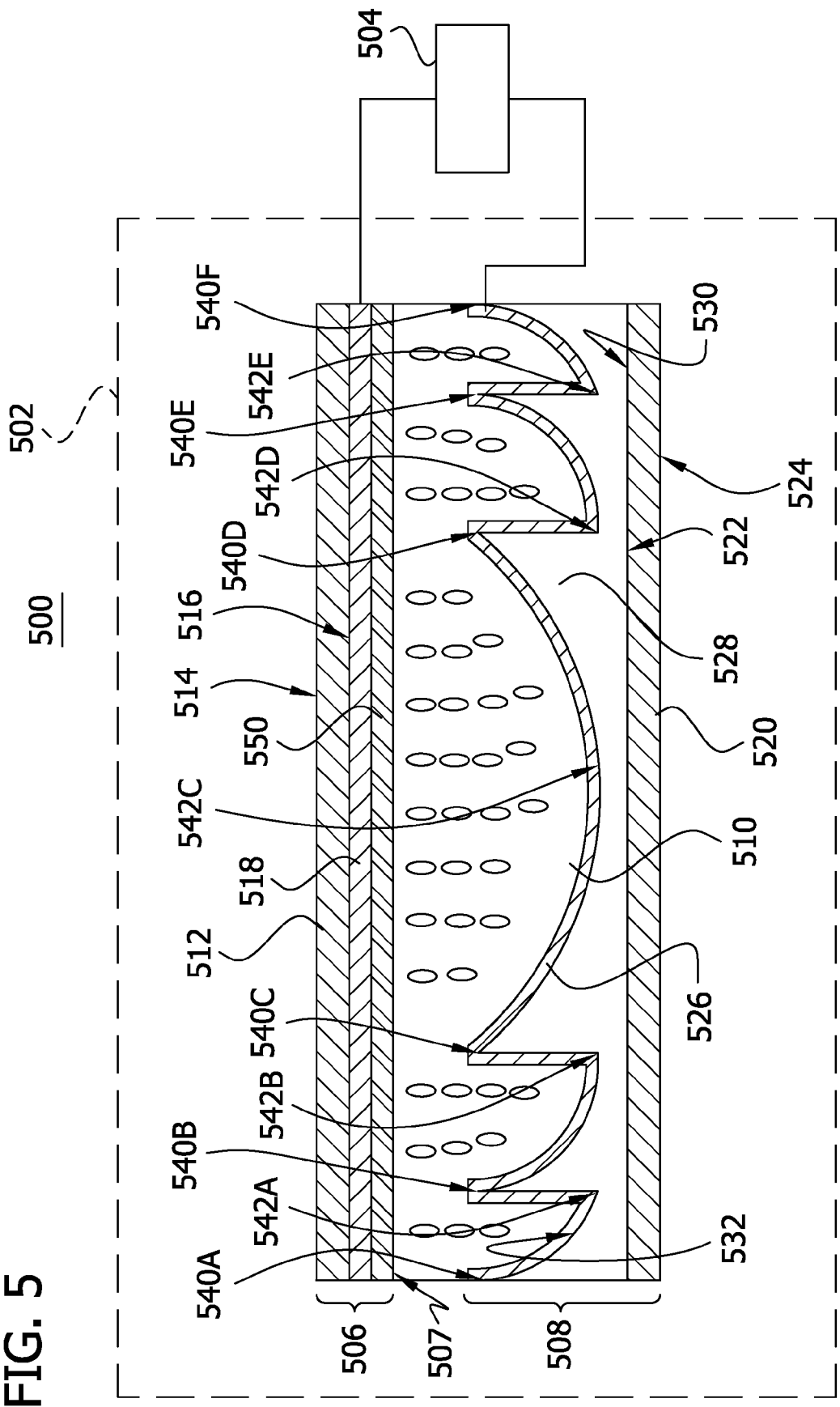
Figure 6:
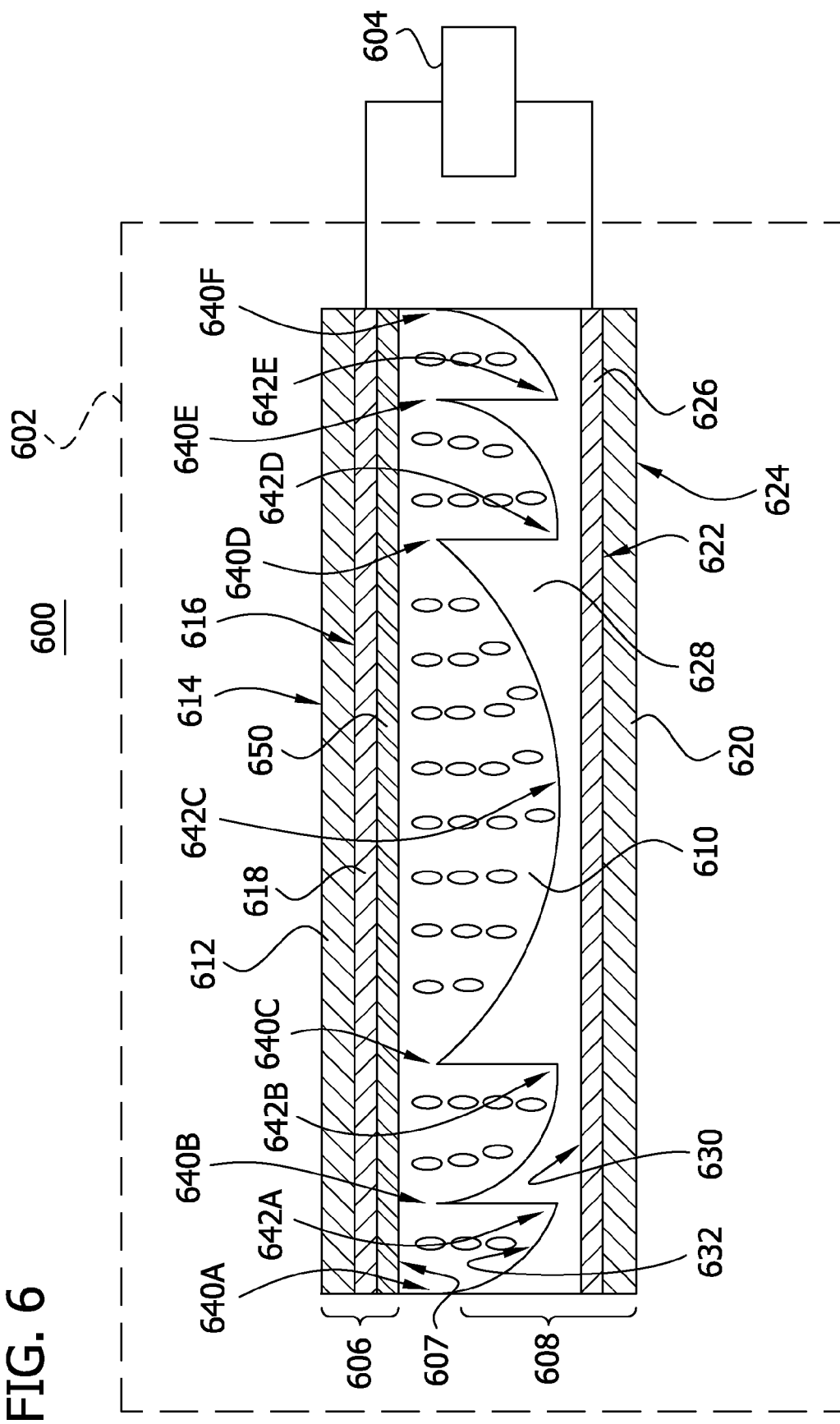

The LC lens systems 300, 400 can be used for a variety of applications, such as display devices, 3D microscopic imaging devices, ophthalmic lenses, and other types of eyewear known in the art. FIGS. 5 and 6 are a schematic of exemplary LC lens systems 500, 600 that have several features, as discussed below, which make them particularly suitable for ophthalmic applications. For example, in one embodiment the LC lens systems 400, 500 have a large lens aperture (e.g., 40 mm), a high diffraction efficiency (e.g., nearly 100%), and a thin LC layer (e.g., 30 micrometers or less). The LC lens 502, 602 operates with a high total transmission (e.g., at least 90%, a low voltage (e.g., less than 10 volts), a fast response time (e.g., about 100 ms), and small aberrations. Similar to the LC lens 302 of FIG. 3, the LC lens 502 illustrated in FIG. 5, has the second conductive layer 526 disposed on the top surface 532 of the lens 528. Similar to the LC lens 402 of FIG. 4, the LC lens 602 illustrated in FIG. 6, has the second conductive layer 626 disposed on the bottom surface 630 of the lens 628.

Figure 7:
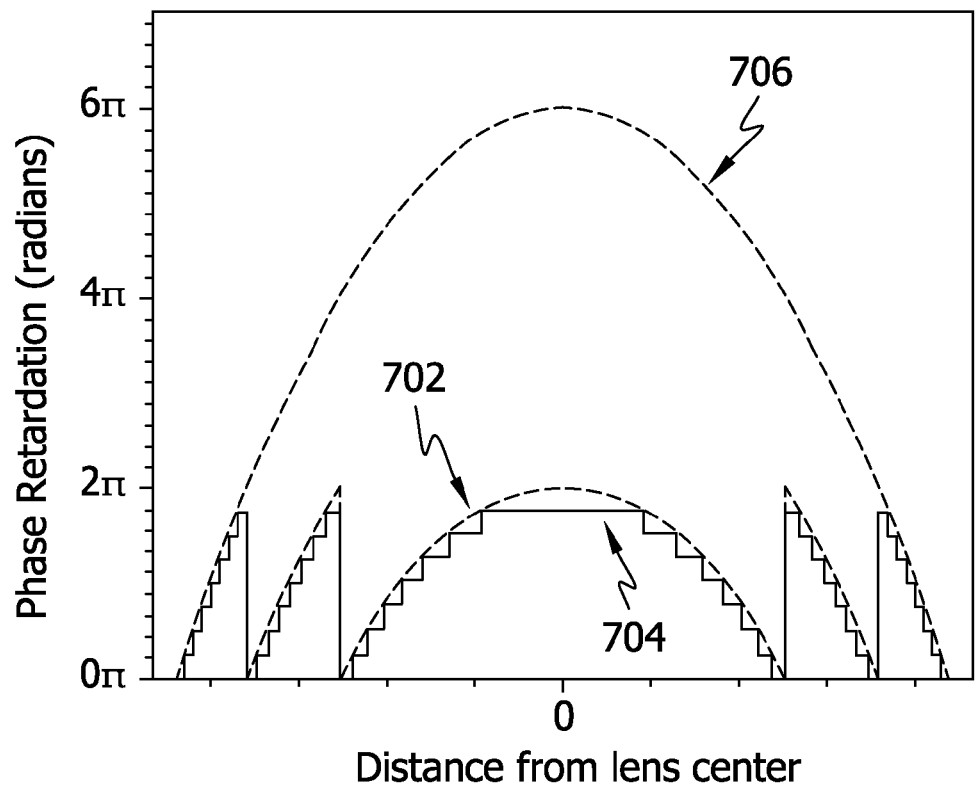
FIG. 7 is a graph illustrating a continuous refractive phase profile, a discrete/staircase diffractive phase profile, and a continuous diffractive phase profile.

In particular, the second substrate assembly 508 has a continuous grooved phase profile, such as a continuous Fresnel phase profile or a continuous diffractive phase profile. Specifically, the second electrode layer 526 is continuous, and the lens 528 is a diffractive lens or a Fresnel lens (i.e., the top surface 532 or the lens 528 is grooved). As discussed above, because the second conductive layer 526 is continuous across the entire top surface 532 of the lens 528, the LC lens 502 is continuously tunable. More specifically, the focal length can be adjusted to essentially any value and is not limited to strict multiples of the original focal length. Thus, the phase profile for the second substrate assembly 508 can be expressed as a single polynomial function (e.g., single multi-order polynomial function). FIG. 7 illustrates an exemplary continuous diffractive phase profile (indicated with reference numeral 702) and compares it to a discrete diffractive phase profile (indicated with reference numeral 704) of a substrate assembly having discrete electrodes (e.g., stairstep phase profile, limited ability to tune focal length based on number of discrete electrodes) rather than a continuous electrode layer. Since the LC lens 502 is continuously tunable (i.e., the focal length can be adjusted to essentially any value), substantially all of the lens aperture can be used for each of any number of vision tasks. For example, the LC lens 502 may have a 50 mm lens aperture that is continuously tuned for correcting vision at each of several different visual distances.

Additionally, FIG. 7 compares the shape (phase profile) of the lens with the continuous diffractive profile 702 to the shape of a refractive lens (indicated with reference numeral 706). As shown, the lens with the grooved surface (e.g., diffractive profile) 702 is substantially thinner than the refractive lens 706. In one embodiment, the lens 528 is a diffractive lens. Since a diffractive lens has opposite chromatic aberration as to the human eye, they can cancel each other to an extent. However, the brain generally adapts to a certain degree of chromatic aberration, so balancing the dispersion of the diffractive lens and the eye is not necessarily desirable. Instead, the brain can handle both balanced and imbalanced chromatic aberrations. The chromatic aberration of the diffractive lens can be reduced by using the concept of multi-order diffractive lens, where the phase jump at the zone boundaries is $p2\pi$ ($p>1$, integer) for the design wavelength. The focal length at a wavelength $\lambda$ is given by $$f(\lambda) = \frac{p\lambda_0 F_0}{m\lambda}$$

where m is the diffraction order, and $F_0$ is the focal length at wavelength $\lambda_0$. When the quantity $p\lambda_0/m\lambda$ is set equal to unity, several wavelengths within a given band can come to a common focus. Hence p is a construction parameter and is usually constant across the lens radius, and the wavelengths that are focused to a common point are chosen from a set of diffraction orders, i.e., multi-order diffractive lenses. Alternatively, in an other embodiment, the lens 528 is a Fresnel lens. In this case, the focusing of the light is based on the refractive principle and the chromatic aberration can be significantly reduced correspondingly. Therefore, these tunable lenses can be used for broadband optical imaging.

In the illustrated LC lens 502, the lens 528 is a Fresnel lens. As generally known, the Fresnel lens has a grooved surface defining a series of concentric annular rings/grooves with a common focus for all the wavelengths. Each groove acts as a small annular lens or prism to refract light to a desired focal point. The concentric rings/grooves lie in approximately the same plane making a Fresnel lens substantially thinner/flatter than curved refractive lenses with similar reflective properties. The grooved surface 532 of the Fresnel lens 528 comprises a plurality of groove crests 540 and a plurality of groove troughs 542. In one embodiment, each groove trough 542 is coplanar (e.g., substantially coplanar/level) with each other groove trough 542, whereas each groove crest 540 is not coplanar with each other groove crest 540. Alternatively, in an other embodiment, each groove crest 540 is coplanar (e.g., substantially coplanar/level) with each other groove crest 540, whereas each groove trough 542 is not coplanar with each other groove trough 542. For example, the thickness of the LC layer (i.e., distance between the groove crest 540 and the bottom surface 507 of the first substrate 506) may be around 35 micrometers or less and the pitch (i.e., distance between the deepest groove trough 542 and the bottom surface 507 of the first substrate 506) may be around 50 micrometers or less. In yet an other embodiment each groove crest 540 is coplanar (e.g., substantially coplanar/level) with each other groove crest 540, and each groove trough 524 is coplanar (e.g., substantially coplanar/level) with each other groove trough 524.

Another feature of the LC lens 502 that minimizes the thickness of the LC layer 510 relates to the interfacing of the LC layer 510 with the lens 528 and the second conductive layer 520. As illustrated in FIG. 5, the LC layer 510 is received in the grooves 542 of the lens 528. Accordingly, the thickness of the LC layer 510 is minimized, which in turn minimizes the total thickness of the LC layer 510 making it particularly desirable for ophthalmic applications. Additionally, the second conductive layer 520 is disposed between the grooved surface 532 of the lens 528 and the LC layer 510, and is likewise received in the grooves 542 of the lens 528. Thus, the voltage needed to control the LC layer 510 is minimized. Having a thin LC layer 510 in direct contact with the electrode (e.g., second conductive layer 520) minimizes the response time of the LC lens 502.

In one embodiment, the LC lens 502 has a substrate which enables the LC system to be power-failure safe. In particular, the first and/or second substrates 512, 520 are selected based on the properties of the LC material when the control unit is the off mode so that user's vision is not distorted in the event of a power failure. For example, each of the first and second substrates 512, 520 may have a refractive index that is matched to the refractive index of the LC layer 510 when no voltage is being applied.

In one embodiment, the LC lens system 500 further comprises an alignment component for controlling the LC lens 502 in the off state and enabling the power-failure safe mode. In particular, the alignment component aligns LC molecules of the LC layer 510 in a predetermined direction when no voltage is applied across the LC layer 510. In the LC lens system 500, the alignment component causes the LC material to be in a homeotropic alignment state (e.g., LC molecules are substantially perpendicular to the substrates) when no voltage is applied across the LC layer 510. In the illustrated embodiment, the first substrate assembly 506 includes an alignment layer 550 on the bottom surface of the first conductive layer 518 and adjacent to the LC layer 510. In one embodiment, the alignment layer 550 is a polyimide material that is spin-coated on the surface of the conductive layer 518 and, the LC layer comprises negative LC material (e.g., negative LC doped with reactive nematic monomer, LC material having negative dielectric anisotropy). A photoinitiator is applied to the alignment layer 550 for initial alignment. Alternatively, in an other embodiment, homeotropic alignment is achieved using nanoparticle-induced vertical alignment, or other known techniques.

In an alternative embodiment, such as an LC lens system having a lens without microstructures on the surfaces, the alignment component may cause the LC material to be in a homogeneous (e.g., LC molecules are substantially parallel to the substrates), rather than a homeotropic alignment state when no voltage is applied across the LC layer. For example, the alignment component may include a first alignment layer disposed between the first conductive layer 518 and the LC layer 510 and a second alignment layer disposed between LC layer 510 and the lens 528. The first and second alignment layers may be a polyvinyl alcohol that is rubbed with a velvet cloth for initial alignment as generally known in the art. Since homogeneously aligned nematic LC is polarization sensitive, in one embodiment, two lenses with orthogonal buffing directions may be integrated as a single polarization insensitive lens. Specifically, the two focal spots are overlapped and the lenses are cemented together.

In one embodiment, an antireflection coating is deposited on the external surfaces 414, 424 of the first and/or second substrates 512, 520 to eliminate reflection at the top and bottom surfaces 514, 524 of the LC lens 502 and thereby maximize the total transmission of the LC lens 502. Additionally or alternatively, each of the first and second conductive layers 518, 526 maybe applied using a thin-film deposition technique to substantially eliminate any reflection to between first and second substrates 512, 520 and the respective first and second conductive layers 518, 528. Accordingly, in one example, the total transmission of the LC lens 510 is greater than 90%.

In one embodiment, the LC lens 502 itself is used to correct vision, including correcting near, intermediate, and distance vision. For example, the control unit may be configured to vary the voltage during the on mode to allow the focusing power to be continuously tuned from plano to +4D. This range covers the typical add powers needed for presbyopes and allows the entire aperture of the LC lens to be used for correcting each type (near, intermediate, distance) of vision task. Thus, the LC lens 502 can be universally used by all presbyopes without requiring the custom fabrication of conventional lenses (i.e., refractive positive or negative lenses).

As generally known in the art, a spherical correction corrects refractive error of the eye with a single convergent or divergent refractive power in all meridians. A cylindrical correction corrects astigmatic refractive error of the eye by adding or subtracting power cylindrically in a specific meridian and axis. The cylindrical focusing power of the LC lens 502 can be provided by controlling the shape of zone of the lens 528. For example, the LC lens 502 may be configured to have a cylindrical correction component and a spherical correction component by using elliptically shaped zones (ellipses) and controlling the axis of the ellipses.

Figure 8A:
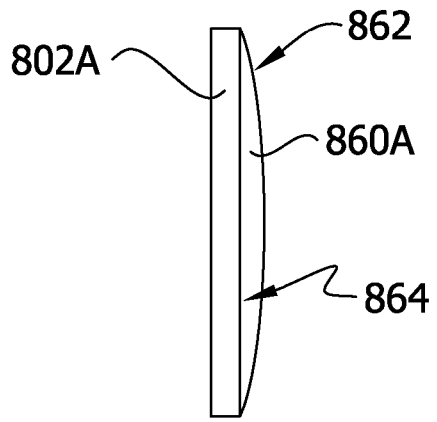
FIGS. 8A and 8B are diagrams each illustrating an adaptive liquid crystal lens in combination with a conventional lens in accordance with an embodiment of the present invention.
Figure 8B:
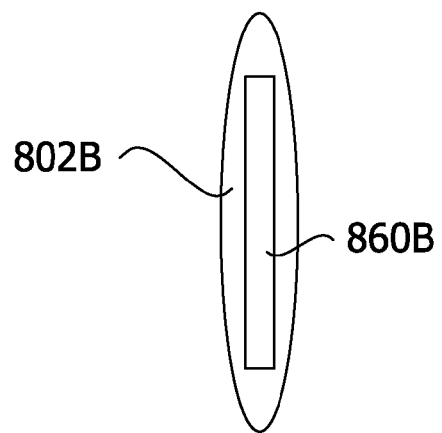

As generally illustrated in FIGS. 8A and 8B, in other embodiments, the LC lens 802 is combined with a conventional lens 860, which is a refractive positive or negative lens, to provide correction of hyperopic, and myopic, and/or astigmatic presbyopia for different vision tasks (e.g., near, intermediate, distance). The conventional lens may be made of ophthalmic plastic in order to minimize the weight of the lens 860, or alternatively other materials (e.g., glass, quartz) generally known in the art may be used. In one embodiment, the conventional lens 860 is designed to correct distance vision and the LC lens 802 is designed to correct intermediate and/or near vision. This configuration, particularly when used with an LC lens 802 having the alignment component discussed above, allows the LC lens 802 to be power-failure safe since the "on" and "off" states of the LC lens 802 allow for near- and distance-vision, respectively, for presbyopic eyes.

In one embodiment, the conventional lens 860 has spherical correction component for providing spherical correction for distance vision, and the LC lens 802 is configured to provide intermediate, and near vision correction. The LC lens 802 may also provide some residual distance vision correction if the power of the spherical lens is not enough. In another embodiment, the conventional lens 860 has both a spherical correction component and a cylindrical correction component for providing both spherical correction for distance vision and astigmatic correction for all the vision tasks. The LC lens 802 is configured for primarily correcting intermediate, and near vision. The spherical power of the conventional lens 860 can be either positive or negative. Therefore, the combination of the LC lens 802 and the conventional lens 660 has very powerful capabilities, particularly for correcting a presbyopic eye with astigmatism wherein the amount of cylindrical correction is substantially constant for different vision tasks.

FIGS. 8A and 8B illustrate two exemplary configurations in which the LC lens 802 is combined with a conventional lens 860 in accordance with embodiments of the invention. As illustrated in FIG. 8A, in one embodiment, the LC lens 802A is adhered to the conventional lens 860A, which is a refractive positive or negative lens. The conventional lens 860A has a curved surface 862 (e.g., convex, concave) and a substantially flat surface 864. As shown, the LC lens 802A is adjacent to the substantially flat surface 864 of the conventional lens 860A. In one embodiment, the substantially flat surface 864 of the conventional lens 860A is opposite the top surface of the first substrate of the LC lens 802A. In another embodiment, the substantially flat surface 864 of the conventional lens 860A is opposite the bottom surface of the second substrate of the LC lens 802A. Alternatively, as illustrated in FIG. 8B, the LC lens 802B may be embedded in the conventional lens 860B between the substantially flat and curved surfaces of the conventional lens 880B.

Figure 9:
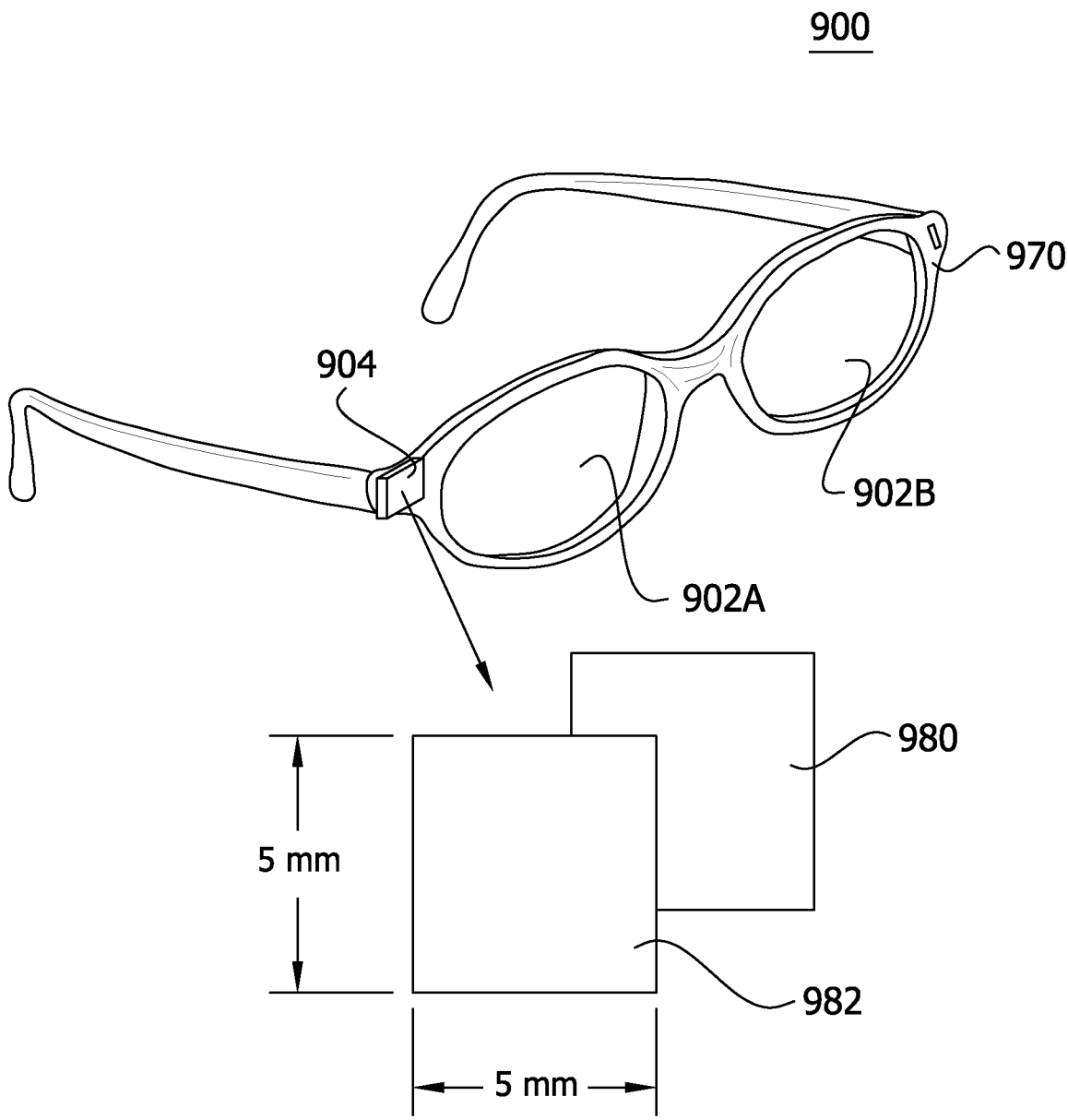
FIG. 9 is a diagram illustrating an adaptive liquid crystal lens eyeglass system in accordance with an embodiment of the present invention.

FIG. 9 illustrates an LC lens system 900 configured for use as eyeglasses in accordance with an embodiment of the present invention. The LC lens system 900 includes an eyeglass frame 970 supporting two LC lenses 902A and 902B. The control unit 904 is attached to the eyeglass frame 970. The control unit 904 includes an actuator (e.g., control button), a driver 980 for providing the voltage applied to the LC lenses 902, and a controller 982 for operating the driver 980 and controlling the voltage applied to the LC lenses 902 as a function of the actuator. The controller 982 is compact and may be flip chip bonded to the driver 980. According to the illustrated embodiment, the driver 980 and controller 982 have a size (e.g., approximately 5 mm×5 mm×2 mm) which allows the control unit 904 to be placed (e.g., attached, mounted, integrated) at the corner/hinge of the eyeglass frame 970.

Figure 10:
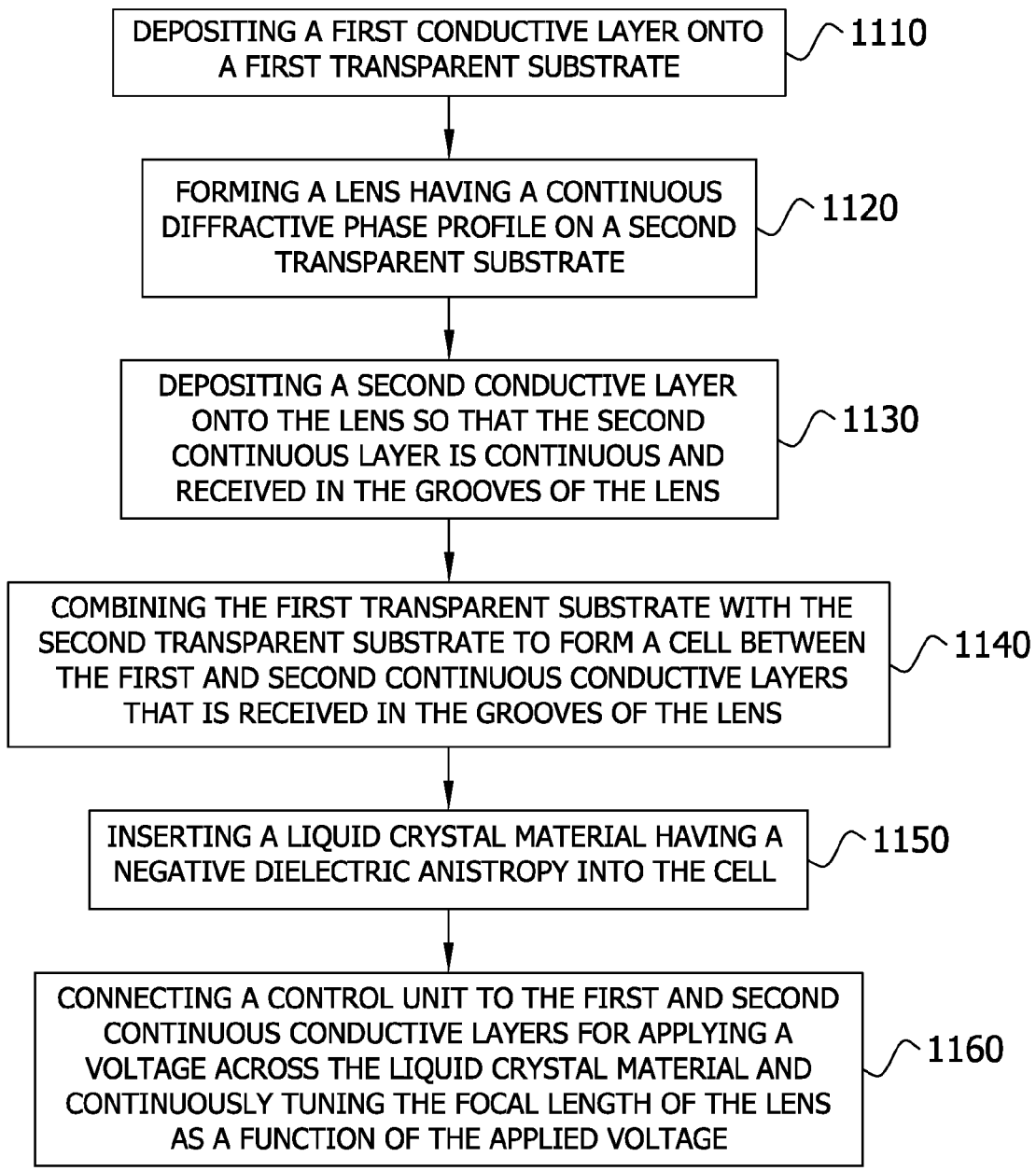
FIG. 10 is a flow diagram illustrating a method of making a liquid crystal lens system in accordance with an embodiment of the present invention.

FIG. 10 is a flow diagram illustrating a method 1000 of making an LC lens system in accordance with an embodiment of the present invention. At 1010, the method 1000 includes depositing a first conductive layer onto a first transparent substrate. In one embodiment, conductive material, such as indium oxide, tin oxide, or indium tin oxide (ITO), is substantially uniformly/continuously deposited on the first substrate (e.g., glass, plastic) using a film deposition technique so that there are no voids in coverage of the conductive material on the first substrate. In one embodiment, the method additionally includes depositing an alignment layer on top of the first conductive layer. For example, the method may include spin-coating the first conductive layer with a polyimide to form an alignment layer, and subsequently applying a photoinitiator for initial alignment.

At 1020, the method 1000 includes forming a lens having a continuous grooved phase profile (e.g., continuous Fresnel profile, continuous diffractive profile) on a second transparent substrate (e.g., glass, plastic). In one embodiment, the phase profile of the lens is fabricated using micro-optic fabrication techniques. For example, diamond turning may be used to form the lens directly on the second transparent substrate. Alternatively, a molding technique may be used to form the lens. More particularly, diamond turning or other known techniques may be used to form a mold of the lens. The mold has a shape complementing the shape (e.g., phase profile) of the lens. A liquid plastic or another transparent lens material is disposed into the mold and remains there until it hardens (e.g., solidifies). The solidified lens material is removed from lens mold and then attached to the second transparent substrate. The lens mold may be used to form (e.g., mass produce) a plurality of lenses.

At 1030, the method 1000 similarly includes depositing a second conductive layer onto the lens. The lens has a top surface defining a plurality of grooves, and a bottom substantially flat surface that is adjacent to the second transparent substrate. In one embodiment, conductive material, such as indium oxide, tin oxide, or indium tin oxide (ITO), is substantially uniformly/continuously deposited on the top surface of lens using a film deposition technique so that there are no voids in coverage of the conductive material on the second substrate and the conductive material is received in the grooves of the lens.

At 1040, the method 1000 includes combining the first transparent substrate having the first conductive layer with the second transparent substrate having the lens and the second conductive layer to form a cell between the first conductive layer and the second conductive layer. In particular, the cell is received in the grooves of the lens/second conductive layer. At the edge of the lens, a glue mixed with spacers of particular size is used to integrate the two substrates and control the thickness of the cell. At 1050, the method 1000 includes inserting an LC material having a negative dielectric anistropy into the cell formed between the first and second conductive layers. In one embodiment, capillary action is used to fill the cell with LC material at a temperature above the clearing point (e.g., 60 degrees Celsius). The LC material is then cooled to room temperature at a rate of approximately 1 degree Celsius per minute. Once the cell has been filled and cooled, the cell may be sealed to prevent leakage.

In one embodiment, the method includes applying a photoinitiator to the LC material so that the LC material is in a homeotropic state. In an alternative embodiment, the method includes applying nanoparticles to the LC material to induce vertical alignment of the LC material.

At 1060, the method 1000 includes connecting the controller to the first and second conductive layers. As discussed above, the controller is configured for applying a voltage across the LC material and controlling the focal length of the lens as a function of the applied voltage.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An adaptive liquid crystal lens system comprising:
    a first substrate assembly including:
        a first transparent substrate having a top surface and a bottom surface;
        only one alignment layer having a top surface and a bottom surface; and
        a first conductive layer adjacent to the bottom surface of the first transparent substrate and adjacent to the top surface of the alignment layer;
    a second substrate assembly having a continuous grooved phase profile, said second substrate assembly not having an alignment layer and including:
        a second transparent substrate having a top surface and a bottom surface;
        a lens having a grooved surface and a flat surface, said grooved surface defining a plurality of grooves; and
        a second conductive layer, said second conductive layer being a continuous layer adjacent to the lens wherein the second conductive layer is disposed between the top surface of the second transparent substrate and the flat surface of the lens;
    a liquid crystal layer having liquid crystal material, said liquid crystal layer being disposed between the first substrate assembly and the second substrate assembly, wherein said liquid crystal layer is received in the grooves of the lens, and said liquid crystal layer is adjacent to the bottom surface of the alignment layer and is adjacent the grooved surface of the lens, the liquid crystal material to be in a homeotropic state caused by the alignment layer.

2. The adaptive liquid crystal lens system of claim 1 wherein the lens is one of a diffractive lens and a Fresnel lens.

3. The adaptive liquid crystal lens system of claim 1 wherein the grooved surface comprises a plurality of groove crests and a plurality of groove troughs, said plurality of groove crests being coplanar.

4. The adaptive liquid crystal lens system of claim 1 wherein the grooved surface comprises a plurality of groove crests and a plurality of groove troughs, said plurality of groove troughs being coplanar.

5. The adaptive liquid crystal lens system of claim 1 wherein the liquid crystal layer has a thickness and said thickness is less than about thirty five micrometers.

6. The adaptive liquid crystal lens system of claim 1 having a liquid crystal lens adhered to a conventional lens, said liquid crystal lens comprising the first and second substrate assemblies and the liquid crystal layer, said conventional lens having at least one of a spherical correction component and a cylindrical correction component, said conventional lens having a substantially flat surface and a curved surface, the liquid crystal lens is opposite to the substantially flat surface of the conventional lens.

7. The adaptive liquid crystal lens system of claim 1 having a liquid crystal lens integrated with a conventional lens, said liquid crystal lens comprising the first and second substrate assemblies and the liquid crystal layer, said conventional lens having at least one of a spherical correction component and a cylindrical correction component, said conventional lens having a substantially flat surface and a curved surface, wherein the liquid crystal lens is embedded in the conventional lens between the substantially flat surface and the curved surface of said conventional lens.

8. The adaptive liquid crystal lens system of claim 1 further comprising a control unit electrically connected to the first and second conductive layers, said control unit having an off mode in which no voltage is applied to the first and second conductive layers, said control unit having an on mode in which said control unit applies voltage to the first and second conductive layers across the liquid crystal material to control the focal length of the lens and adapted to correct presbyopia, said liquid crystal material being in the homeotropic alignment state when the control unit is in the off mode.

9. The system of claim 1 wherein said alignment layer has a photoinitiator applied thereto.

* * * * *